US012653323B2

(12) United States Patent
Bonvouloir et al.

(10) Patent No.: US 12,653,323 B2
(45) Date of Patent: Jun. 16, 2026

(54) COOLING MATERIAL FOR BEDDING APPLICATIONS

(71) Applicant: SALVI, LLC, West Palm Beach, FL (US)

(72) Inventors: Claude Bonvouloir, West Palm Beach, FL (US); John Vinson, Palm Beach Garden, FL (US)

(73) Assignee: SALVI, LLC, West Palm Beach, FL (US)

( * ) Notice: Subject to any disclaimer, the term of this patent is extended or adjusted under 35 U.S.C. 154(b) by 170 days.

(21) Appl. No.: 18/436,627

(22) Filed: Feb. 8, 2024

(65) Prior Publication Data

US 2025/0255418 A1 Aug. 14, 2025

(51) Int. Cl.
*A47C 21/04* (2006.01)
*B32B 5/26* (2006.01)

(52) U.S. Cl.
CPC .............. *A47C 21/042* (2013.01); *B32B 5/26* (2013.01); *B32B 2250/03* (2013.01); *B32B 2260/04* (2013.01); *B32B 2264/403* (2020.08); *B32B 2307/7376* (2023.05)

(58) Field of Classification Search
CPC ....... A47C 21/042; A47C 21/046; B32B 5/26; B32B 2250/03; B32B 2260/04; B32B 2264/403; B32B 2307/7376; B32B 2250/20
USPC .......................................................... 428/365
See application file for complete search history.

(56) References Cited

U.S. PATENT DOCUMENTS

| | | | |
|---|---|---|---|
| 11,066,764 B2 | 7/2021 | Alletto, Jr. | |
| 2017/0099965 A1* | 4/2017 | Alletto, Jr. ........... | A47C 31/105 |
| 2023/0279588 A1* | 9/2023 | Padgett .................... | D04B 1/02 |
| | | | 428/219 |

FOREIGN PATENT DOCUMENTS

| | | | | |
|---|---|---|---|---|
| CN | 106835407 A | * | 6/2017 | ............... B32B 7/12 |
| CN | 113561581 A | * | 10/2021 | ............... B32B 5/06 |

* cited by examiner

*Primary Examiner* — Matthew D Matzek
(74) *Attorney, Agent, or Firm* — McHale & Slavin, P.A.

(57) ABSTRACT

A cooling fabric for using in bedding applications. The cooling material is preferably made as a multi-layered, multi-fabric material. The bedding related cooling material may be used to form, either partially or in whole, bedding products, such as bed sheets, mattress protectors, or pillows.

16 Claims, 6 Drawing Sheets

COOLING MATERIAL FOR BEDDING APPLICATIONS

FIELD OF THE INVENTION

The present invention relates to fabrics; to cooling fabrics useful in bedding applications; and more particularly, to a layered, multiple fabric material that cools a person's body when sleeping thereupon.

BACKGROUND OF THE INVENTION

With the continuous development of technology making it easier for individuals to "work" anywhere and whenever, modern society is designed for continuous operation. In addition, the use of technology puts more demands on individuals as many feel they must always be "connected". In addition to the fast paced, technology driven society, individuals are becoming more aware of the need to pursue a healthy lifestyle.

Although we are living in advanced times, the need for sleep is critical to human functionality. Moreover, in order to achieve a healthy lifestyle, sleep is a critical factor in doing so. Sleep related products, such as mattresses, have been designed to provide a user with optimum sleep capabilities. That is, mattresses have been designed to cooperate with the manner in which a user actually sleeps, such as by providing various firmness that fit their individual preferences or body types, with the goal of providing the user optimum sleep time.

Bedding material is often cited as a means for providing better sleep. Some users prefer certain types of materials, whether it be natural materials, such as cotton materials, such as polyester. In addition, many users prefer bedding to be "cool", absorbing heat from the user' body as they sleep. This "cool" feeling may be obtained by maintaining a cold temperature via air conditioning in a sleep setting. However, air conditioning may not always be available and/or may be costly to run. Cooling materials, such as foams or gels, have been developed as sleeping aides to remove the heat from a user's body. These materials, however, are not always welcoming to the user experience and may be uncomfortable for the user.

SUMMARY OF THE INVENTION

Embodiments of cooling fabric for using in bedding applications are provided. The cooling material is preferably made as a multi-layered, multi-fabric material, such as a multi-layered knitted jacquard fabric. The bedding related cooling material may be used to form, either partially or in whole, bedding products, such as bed sheets, mattress protectors, pillows.

In one embodiment, the cooling material may comprise Tencel, Polyester, recycled fiber-Polyester, and Spandex.

In one embodiment, the cooling material may be a bedding product, such as bed sheets, mattress protectors, and pillows comprising Tencel, Polyester, recycled fiber-Polyester, and Spandex.

In one embodiment, the cooling material may comprise polyethylene (PE), Polyester, recycled fiber-Polyester, Spandex, and Phase Change Material (PCM).

In one embodiment, the cooling may be a bedding product, such as bed sheets, mattress protectors, and pillows comprising cooling material comprising polyethylene (PE), Polyester, recycled fiber-Polyester, Spandex, and Phase Change Material (PCM).

In one embodiment, the cooling material may comprise polyethylene (PE), Graphene Polyester, Polyester, recycled fiber-Polyester, and Spandex.

In one embodiment, the cooling material may be a bedding product, such as bed sheets, mattress protectors, and pillows comprising polyethylene (PE), Graphene Polyester, Polyester, recycled fiber-Polyester, and Spandex.

In one embodiment, the cooling material may comprise polyethylene (PE), Polyester, recycled fiber-Polyester, Spandex, and PCM.

In one embodiment, the cooling material may be a bedding product, such as bed sheets, mattress protectors, and pillows comprising cooling material comprising, polyethylene (PE), Polyester, recycled fiber-Polyester, Spandex, and PCM.

Accordingly, it is an objective of the invention to provide a cooling material.

It is a further objective of the invention to provide a cooling material for use in bedding products.

It is further objective of the invention to provide a multi-layered cooling material.

It is a still further objective of the invention to provide a multi-layered cooling material for use in bedding products.

It is a further objective of the invention to provide a cooling material for use in bedding products, such as bed sheets.

It is yet another objective of the invention to provide a cooling material for use in bedding products, such as mattress protectors.

It is a further objective of the invention to provide a cooling material for use in bedding products, such as pillows.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
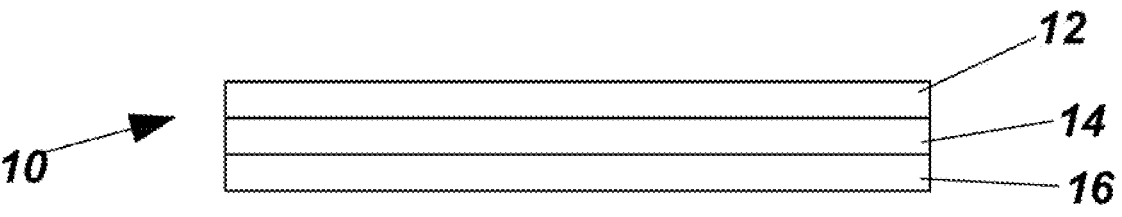
FIG. 1 is a schematic representation of the cooling material having multiple layers: an upper layer, a middle or intermediate layer, and a lower layer.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Embodiments of a cooling fabric for using in bedding applications, referred to generally as a bedding related cooling material 10, are shown. The bedding related cooling material 10 is preferably made as a multi-layered, multi-fabric material, such as a multi-layered knitted jacquard fabric. The bedding related cooling material 10 may be used to form, either partially or in whole, bedding products, such as bed sheets, mattress protectors, pillows.

The bedding related cooling material 10 is designed to absorb heat from a user's body when the user is lying or resting on the material.

The bedding related cooling material 10 may be made of synthetic materials, such synthetic polymers, or as a combination of synthetic materials and natural materials, such as cotton or bamboo. The synthetic materials and/or the natural materials may be made from fabrics, textiles, yarns, fibers, or any other materials known in the fabric or bedding arts.

Referring to FIG. 1, a schematic representation of the cooling material 10 is shown. The cooling material 10 is illustrated as a multi-layered fabric, shown as 3 layers: an upper layer 12, a middle or intermediate layer 14, and a lower layer 16. Each layer of the bedding related cooling material 10 may be made of a layer having one material or fiber types or a combination of two or more materials or fiber types.

Figure 2:
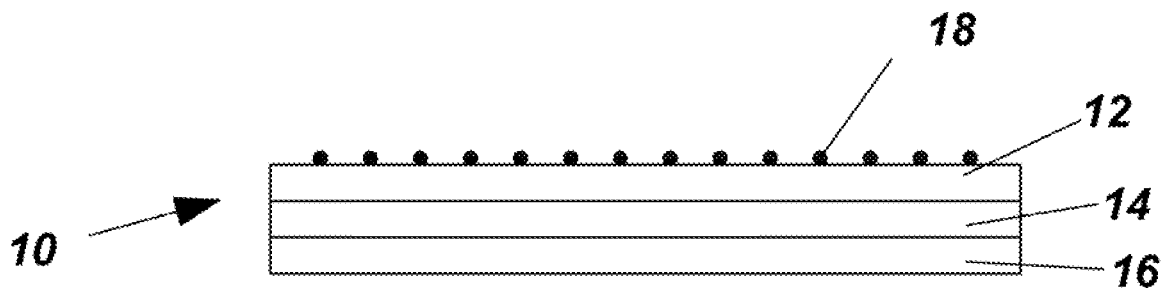
FIG. 2 is a schematic representation of the cooling material illustrated in FIG. 1, in which the upper layer further includes additional material.

FIG. 2 is a schematic representation of the cooling material 10 in which the upper layer 12 further includes additional material(s) 18. The additional material(s) 18 may be a material that is incorporated into material or fibers of the upper layer 12. Alternatively, the additional materials 18 may be incorporated as an additional material layer.

Figure 3:
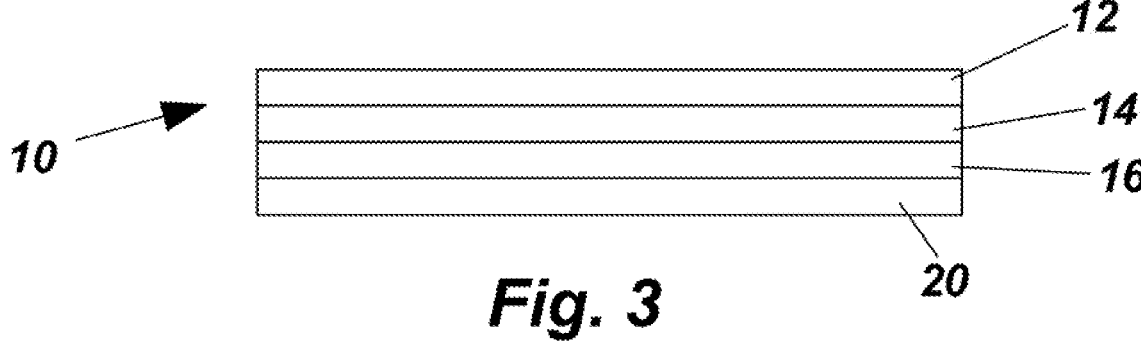
FIG. 3 is a schematic representation of the cooling material illustrated in FIG. 1, having an additional material layer secured to the lower layer.

FIG. 3 is a schematic representation of the cooling material 10 having an additional material layer 20 secured to the lower layer 16. Although not shown, the cooling material 10 illustrated in FIG. 3 may optionally include an additional material(s) 18 (such as a phase change material). The additional material(s) 18 may be added to one the layers, or be incorporated into one or more of the fabric layers and/or to the individual fibers making the fabric. Alternatively, the additional material(s) 18 may form an additional, independent fabric layer.

In an illustrative embodiment, one of the layers or fabrics may include TENCEL. As used herein, TENCEL refers to cellulosic fibers of botanic origin, and can refer to a TENCEL lyocell fiber, a TENCEL modal fiber, or combinations thereof. TENCEL fibers may also be referred to as "regenerative cellulose" fibers, as they may be made from wood pulp (from trees such as beech, birch, eucalyptus, or spruce) which is dissolved in chemical solvents, and extruded to form fibers. TENCEL fibers may also be blended with other fibers, such as cotton, silk, wool, or polyester).

In an illustrative embodiment, one of the layers or fabrics may include polyester. As used herein, polyester is a synthetic fabric made from petroleum. Polyester may be defined as a fiber or fabric made of polymers that contain an ester functional group in every repeat unit of its main chain.

In an illustrative embodiment, one of the layers or fabrics may include recycled fiber. As used herein, recycled fiber may include REPREVE recycled polyester, made from recycled plastic fibers made from polyester waste, such as bottles, and designed to have wicking, thermal, comfort, and other performance technologies embedded in the fiber.

In an illustrative embodiment, one of the layers or fabrics may include a polyester blend. As used herein, polyester blend includes a polyester material or fiber blended with another material or fiber, such as spandex. As used herein, spandex, also known as Lycra or Elastane, refers to a synthetic fiber being a polyether-polyurea copolymer.

In an illustrative embodiment, one of the layers or fabrics may include graphene-polyester. As used herein, graphene-polyester defines a polyester yarn coated with graphene or graphite, preferably 16% graphene. Graphene is a high-tech yarn for anti-static and anti-stress sleep comfort. As a conductor, Graphene helps get rid of static electricity and resulting tension. This anti-static feature protects our bodies against the electrical build up that can have a negative impact on our bodies during sleep by helping remove negative energy and static electricity away from the body. Graphene's superior conductibility also helps minimize stress and exhaustion. Yarns made of graphene contain carbon particles and impart properties to products as a result of its highly conductive form. The high conductivity allows the discharge of static electricity and the voltage associated with it.

Preferably, the graphene is applied or nodded to the fibers of the face of the fabric, or half of the face of the fabric.

Graphene or graphite infused fabric is designed to act as a conductor of electricity, mimicking "earthing" (feet are connected to the ground. Graphene or graphite infused fabric may also provide releases of stress and acts as a natural cooling mineral.

In an illustrative embodiment, one of the layers or fabrics may include a polyethylene (PE), preferably a low molecular weight polyethylene. Low molecular weight polyethylene vs high molecular vs low density vs UHMW (Ultra High Molecular Weight Polyethylene): Polyethylene is a polyolefin. Polyolefins are high molecular-weight hydrocarbons. Polyolefins include linear low-density polyethylene, low density polyethylene, high density polyethylene, polypropylene copolymer, polypropylene, and polymethyl pentene. These are the only plastics that have a lower specific gravity than water. This means that they weigh less than water. When ethylene is polymerized, the result is relatively straight polymer chains. From the main chain, they can branch out. Different kinds of polyethylenes are created from the varying degree of branching in their molecular structure. Below are brief descriptions of how the polyethylenes differ from each other. UHMW (Ultra High Molecular Weight Polyethylene) has extremely long chains, with molecular weight numbering in the millions (usually between 2 to 6 million). HDPE molecules generally have between 700 and 1,800 monomer units per molecule, whereas UHMW molecules tend to have 100,000 to 250,000 monomers each. The chains of UHMW align in the same direction. The bonds between the chains are not very strong; however, because they are so long, more bonds hold it together than polyethylene with shorter chains. These long chains give UHMW high tensile strength. The longer chains transfer load more effectively to the polymer backbone by strengthening intermolecular interactions. This causes the material to be very tough and gives it the highest impact strength of the polyethylenes. It has a density of 0.928-0.941 g/cm3. LDPE (LOW Density Polyethylene) has the most excessive branching. This causes the low density to have a less compact molecular structure, which makes it less dense. It has a density of 0.91-0.925 g/cm3.

LDPE 380-400 Ws1/2/m2, HDPE 300-320 Ws1/2/m2K, UHMWPE 300-350 Ws1/2/m2K per Effusivity=(Ws1/2/m2K) per ASTM D7984-16. Thermal effusivity is a measure of the ability of a material to exchange heat with its immediate surroundings at a surface.

In an illustrative embodiment, one of the layers or fabrics may include one or more of a phase change material (PCM). As used herein, a phase change material is a substance which releases/absorbs sufficient energy at phase transition to provide heating or cooling. PCM provides temperature regulation via the PCM's ability to absorb, store, and release amounts of latent heat over a defined temperature range when the material changes phase or state. The phase change material is fully erased. An illustrative example of a PCM may be a material that is 94% bio-based and formaldehyde-free. In some embodiments, the PCM material may be microencapsulated. The microcapsules are configured to react at capsule melt parameters and pull/absorb heat, and store heat until the temperature of the capsules reaches its reformation portion and releases the heat back. PE provides cool to touch feeling, but when it heats up, it remains hot. In combination with PCM, the PCM provides a mechanism for the PE to cool as the PCM is thermal reaction allowing for cooling and releasing of heat.

Preferably, the PCM is added to fibers via a bathing process. In this process, a pad bath allows for full immersion so all components of the fabric have been PCM coated. Alternately, the PCM may be added via a roll coat application, allowing PCM chemistry to be on the face of the fabric (and closer to where it would contact a user).

One or more embodiments of the cooling material 10 may include a thermoplastic polyurethane laminate. In an illustrative example, the thermoplastic polyurethane laminate have a thickness of between 0.01 and less than 0.1 mm, preferably 0.02 mm, be waterproof, dust mite and allergen proof, prevent/stop particles (and moisture) greater than 1 micron from passing, and be completely breathable, using a monolithic barrier allowing airflow through one side of the coating.

Figure 4:
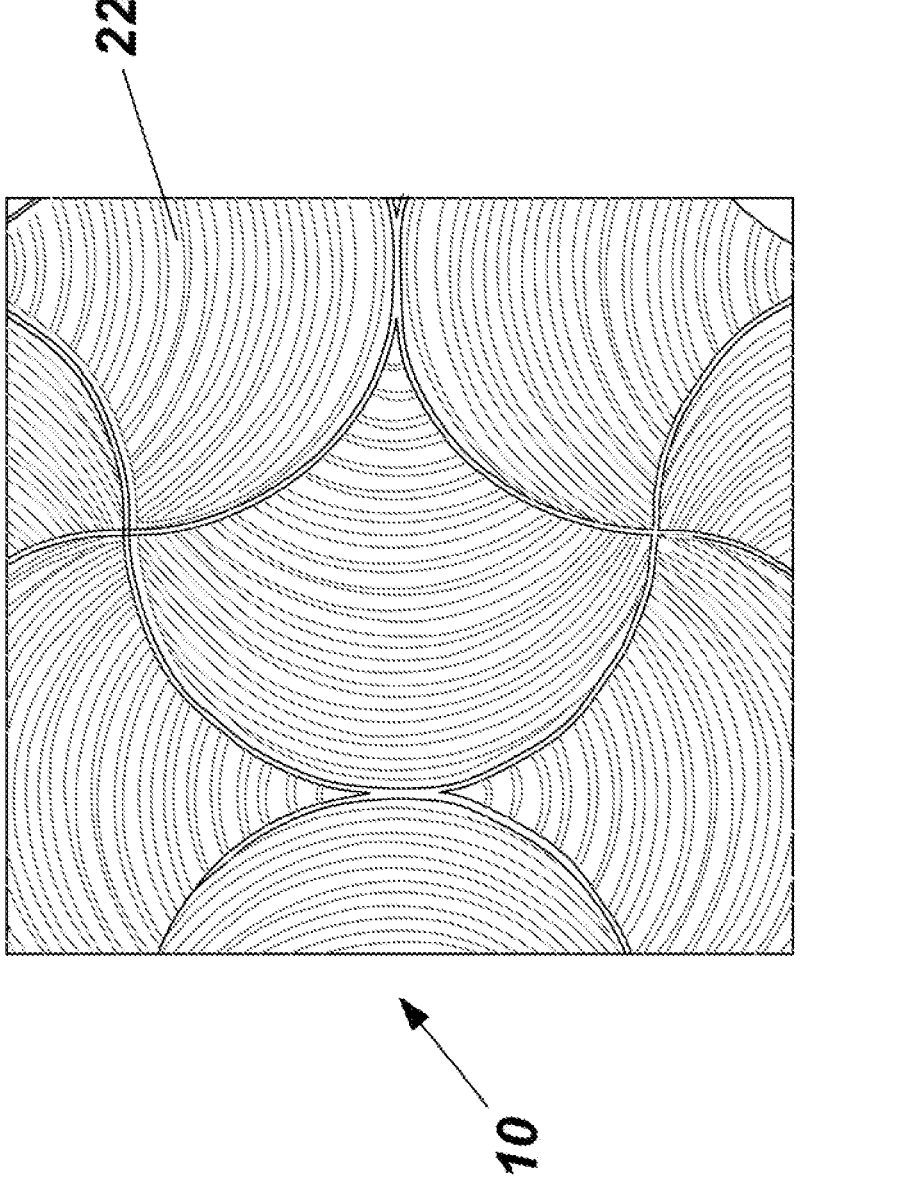
FIG. 4 is an illustrative embodiment of the cooling material shown having a decorative abstract pattern.
Figure 5:
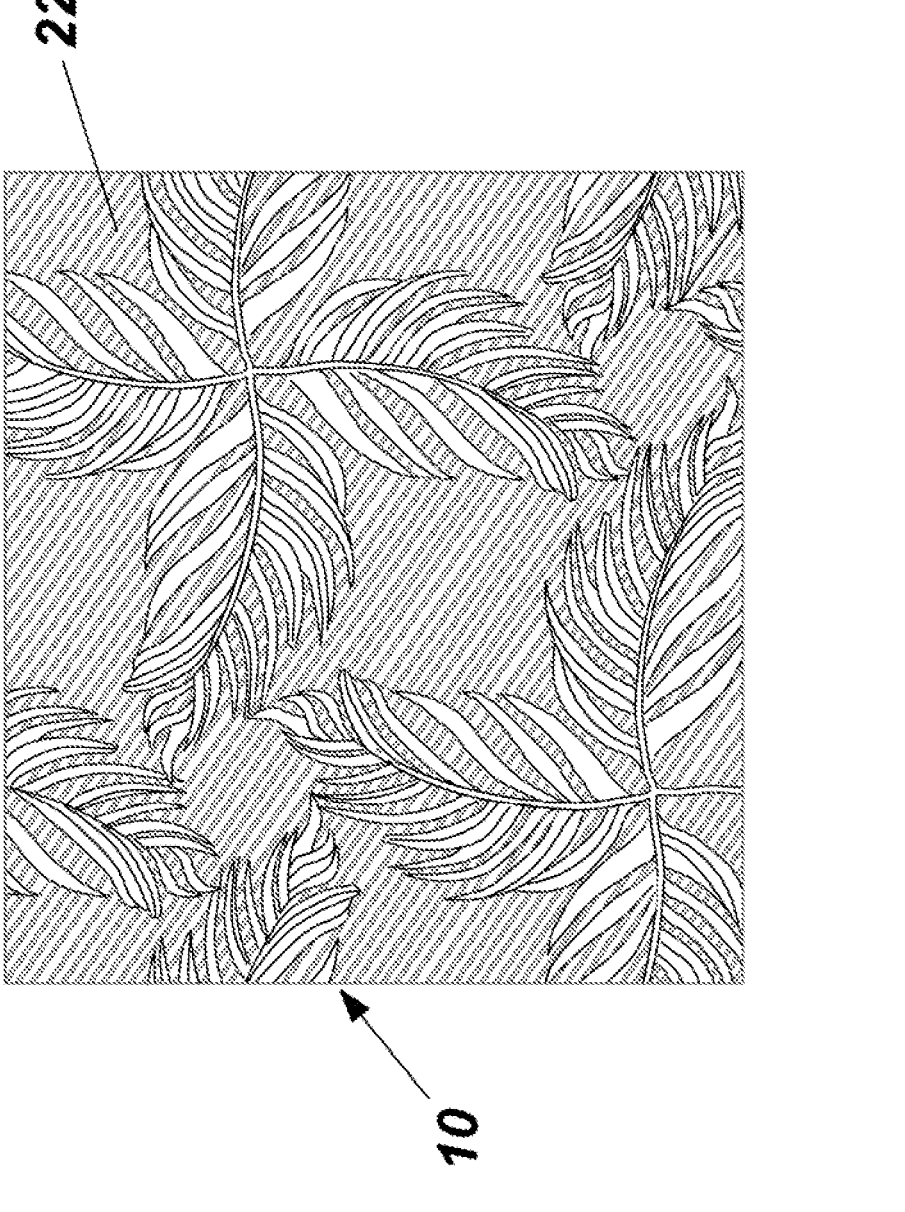
FIG. 5 is an illustrative embodiment of the cooling material shown having a decorative flower pattern.
Figure 6:
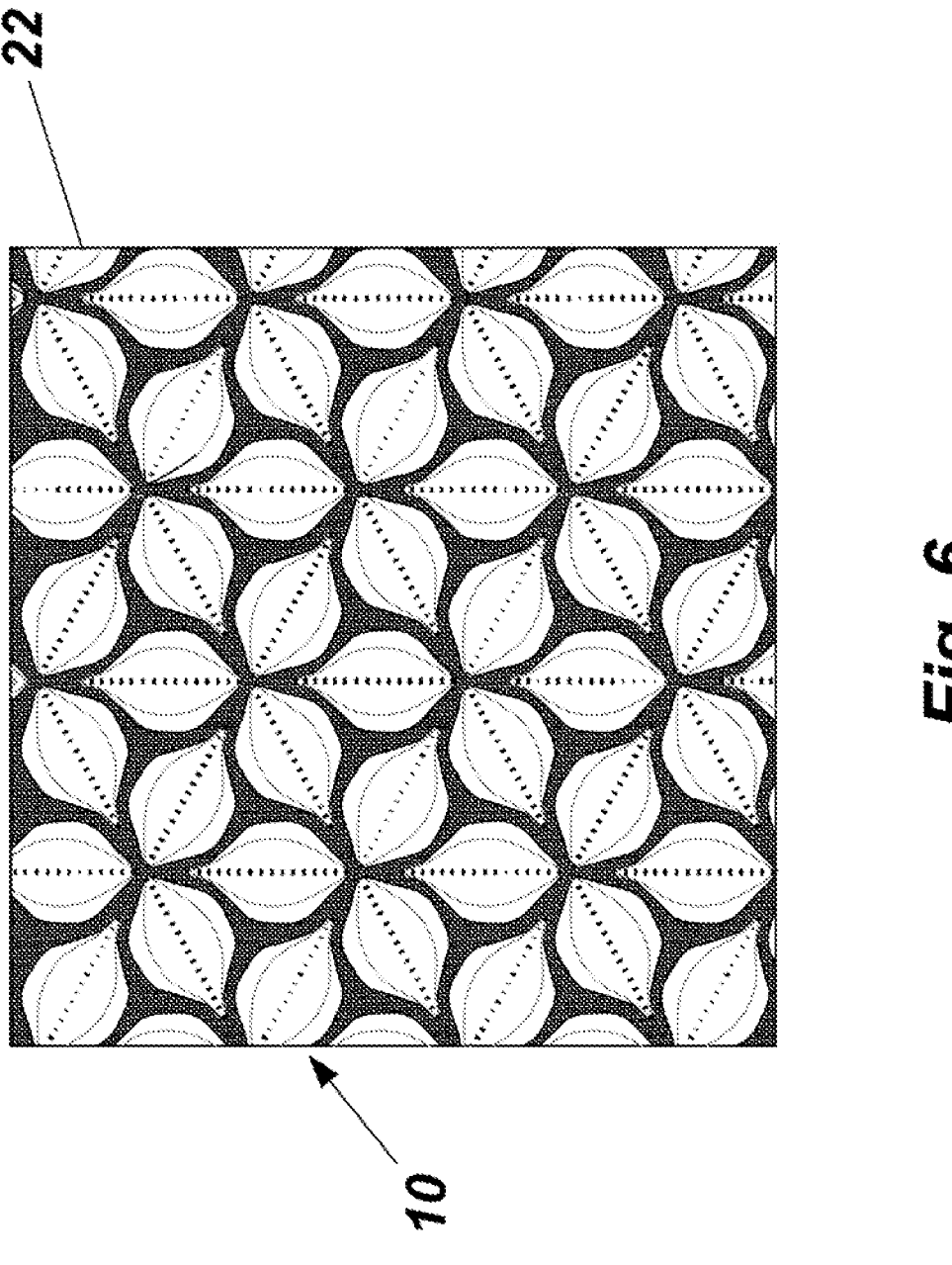
FIG. 6 is an illustrative embodiment of the cooling material shown having a decorative flower petals pattern.
Figure 7:
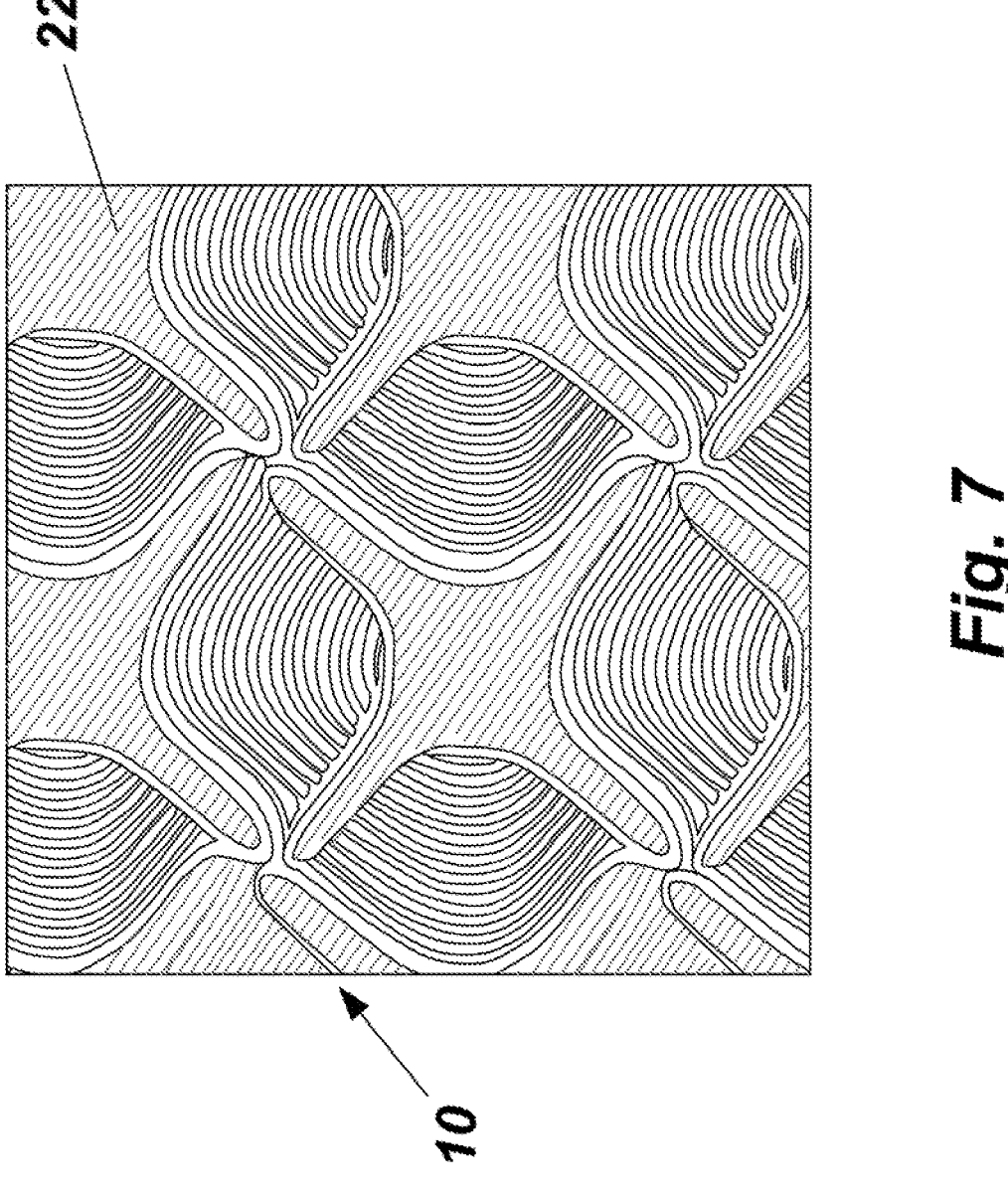
FIG. 7 is an illustrative embodiment of the cooling material shown having an abstract pattern.

Referring to FIGS. 4-7, illustrative examples of the cooling material 10 are shown. Referring to FIG. 4, the cooling material 10 comprising Tencel, Polyester, recycled fiber-Polyester, and Spandex, shown having a surface 22 with a decorative abstract pattern. FIG. 5 illustrates the cooling material 10 comprising PE, Polyester, recycled fiber-Polyester, Spandex, and Phase Change Material (PCM), shown having a surface 22 with a decorative pattern of flowers. FIG. 6 illustrates the cooling material 10 comprising PE, Graphene Polyester, Polyester, recycled fiber-Polyester, and Spandex, shown having a surface 22 with a decorative pattern of plant petals. FIG. 7 illustrates the cooling material 10 comprising PE, Polyester, recycled fiber-Polyester, Spandex, and PCM, shown having a surface 22 with a decorative abstract pattern.

Examples 1A-5B illustrate the several embodiments of the cooling material 10, each having different combinations of fabric materials and/or fabric layers.

Cooling material Example 1A: The cooling material 10 may comprise the following components, in any combination, not necessarily including all components.

| Material |
| --- |
| Polyethylene (LMW) |
| Polyester |
| Graphene-Polyester |
| Tencel |
| Polyester-Recycled |
| Spandex |
| Phase Change Material |
| Thermoplastic Polyurethane Laminate |

Cooling material example 2A: (Relief fabric) Illustrated in FIG. 4, the bedding related cooling material 10 is multi-layer fabric comprising Tencel, Polyester, recycled fiber-Polyester, and Spandex. An optional thermoplastic polyurethane laminate may be included.

| Material | Concentration (% of total) |
| --- | --- |
| Upper Layer: | |
| Tencel | 5%-50% |
| Polyester-Polyamide (nylon) | 5%-50% |
| Middle Layer: | |
| Polyester | 5%-50% |
| Bottom Layer: | |
| Tencel | 5%-50% |
| Spandex | 1-10% |
| Polyester | 5%-50% |
| Optional: | Thickness: |
| Thermoplastic Polyurethane Laminate | between 0.01 and less than 0.1 mm |

Cooling material example 2B: An alternative embodiment of the cooling fabric described in example 2A may be:

| Material | Concentration (% of total) |
| --- | --- |
| Upper Layer: | |
| Tencel | 24% |
| Polyester-Polyamide (nylon) | 10% |
| Middle Layer: | |
| Polyester | 27% |
| Bottom Layer: | |
| Tencel | 24% |
| Spandex | 2% |
| Polyester | 13% |
| Optional: | Thickness: |
| Thermoplastic Polyurethane Laminate | between 0.02 mm |

Cooling material example 3A: (Renew fabric) Illustrated in FIG. 5, the bedding related cooling material 10 is a multi-layered fabric comprising PE, Polyester, recycled fiber-Polyester, Spandex, and Phase Change Material (PCM). An optional thermoplastic polyurethane laminate may be included.

7

| Material | Concentration |
|---|---|
| Upper Layer: | |
| Polyethylene (LMW) | 5%-50% |
| Middle Layer: | |
| Polyester | 5%-50% |
| Bottom Layer: | |
| Spandex | 1%-10% |
| Polyester | 5%-50% |
| TOPICAL FINISH | 5%-50% |
| Phase Change Material | |
| Optional: | Thickness: |
| Thermoplastic Polyurethane | between 0.01 and |
| Laminate | less than 0.1 mm |

Cooling material example 3B: An alternative embodiment of the cooling fabric described in example 3A may be:

| Material | Concentration |
|---|---|
| Upper Layer: | |
| Polyethylene (LMW) | 44% |
| Middle Layer: | |
| Polyester | 30% |
| Bottom Layer: | |
| Spandex | 2% |
| Polyester | 24% |
| TOPICAL FINISH | 26% |
| Phase Change Material | |
| Optional: | Thickness: |
| Thermoplastic Polyurethane | 0.02 mm |
| Laminate | |

The above material was tested and provided an average Qmax score of 0.327.

Cooling material example 4A: (Recharge fabric) Illustrated in FIG. 6, the bedding related cooling material 10 is a multilayer fabric comprising PE, Graphene Polyester, Polyester, recycled fiber-Polyester, and Spandex. An optional thermoplastic polyurethane laminate may be included.

| Material | Concentration |
|---|---|
| Upper Layer: | |
| Polyethylene (LMW) | 5%-50% |
| Polyester-graphene | 5%-50% |
| Middle Layer: | |
| Polyester | 5%-50% |
| Bottom Layer: | |
| Spandex | 1%-10% |
| Polyester | 5%-50% |
| Optional: | Thickness: |
| Thermoplastic Polyurethane | between 0.01 and |
| Laminate | less than 0.1 mm |

8

Cooling material example 4B: An alternative embodiment of the cooling fabric described in example 4A may be:

| Material | Concentration |
|---|---|
| Upper Layer: | |
| Polyethylene (LMW) | 25% |
| Polyester-graphene | 16% |
| Middle Layer: | |
| Polyester | 36% |
| Bottom Layer: | |
| Spandex | 2% |
| Polyester | 21 |
| Optional: | Thickness: |
| Thermoplastic Polyurethane | 0.02 mm |
| Laminate | |

The above material was tested and provided an average Qmax score of 0.232.

Cooling material example 5A: (Recover fabric) Illustrated in FIG. 7, the bedding related cooling material 10 is a multilayer fabric comprising PE, Polyester, recycled fiber-Polyester, Spandex, and PCM. An optional thermoplastic polyurethane laminate may be included.

| Material | Concentration |
|---|---|
| Upper layer: | |
| Polyethylene (LMW) | 5%-60% |
| Middle layer: | |
| Polyester (LMW) | 5%-50% |
| Bottom Layer: | |
| Spandex | 1%-10% |
| Polyester (LMW) | 5%-50% |
| TOPICAL FINISH | 5%-50% |
| Phase Change Material | |

Cooling material example 5B: An alternative embodiment of the cooling fabric described in example 5A may be:

| Material | Concentration |
|---|---|
| Upper layer: | |
| Polyethylene (LMW) | 53% |
| Middle layer: | |
| Polyester (LMW) | 20% |
| Bottom Layer: | |
| Spandex | 2% |
| Polyester (LMW) | 25% |
| TOPICAL FINISH | 15% |
| Phase Change Material | |

The above material was tested and provided an average Qmax score of 0.349.

Figure 8:
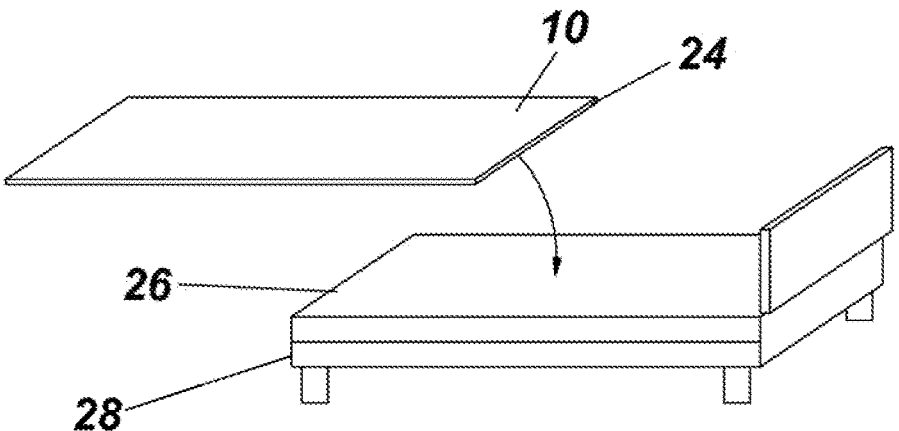
FIG. 8 illustrates a bed sheet made of, or incorporating, either partially or in whole, the cooling material.

As illustrated in FIG. 8, the cooling material 10 forms, or is incorporated into, partially or in whole, a bed sheet 24 that fits on a mattress 26 of a bed 28. Accordingly, one or more panels or parts of the bed sheet 24 is/are made of or includes the cooling material 10.

Figure 9:
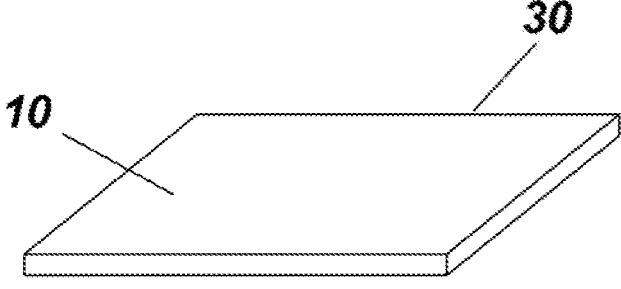
FIG. 9 illustrates a mattress pad made of, or incorporating, either partially or in whole, the cooling material.

As illustrated in FIG. 9, the cooling material 10 forms, or is incorporated into, partially in whole, a mattress pad 30. Accordingly, one or more panels or parts of the mattress pad 30 is/are made of or includes the cooling material 10.

Figure 10:
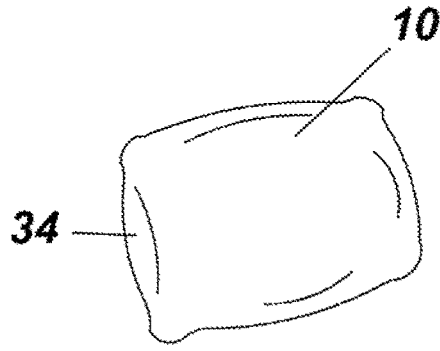
FIG. 10 illustrates a pillow made of, or incorporating, either partially in whole, the cooling material.

As illustrated in FIG. 10, the cooling material 10 forms, or is incorporated into, partially or in whole, a mattress 32. Accordingly, one or more panels or parts of the mattress 32 is/are made of or includes the cooling material 10.

As illustrated in FIG. 11, the cooling material 10 forms, or is incorporated into, partially or in whole, a pillow 34. Accordingly, one or more panels or parts of the pillow 34 is/are made of or includes the cooling material 10.

Coolness Testing: Q-max values

Test Procedure: A heated plate (warmer than the specimen by $\Delta T$) is pressed on the specimen. This simulates the situation when the fabric touches the human skin. The peak value of heat transferred is Q-max.

Test condition: $20\pm2°$ C.

Relative Humidity: 65%±4% RH

Test Surface: face Side, $\Delta T$=20° C.

Sample Recover (W/cm$^2$)

Test 1:0.346

Test 2:0.358

Test 3:0.349

Test 4:0.350

Test 5:0.342

Average: 0.349

Sample Renew (W/cm$^2$)

Test 1:0.327

Test 2:0.330

Test 3:0.331

Test 4:0.320

Test 5:0.329

Average: 0.327

Sample Recharge (W/cm$^2$)

Test 1:0.231

Test 2:0.224

Test 3:0.230

Test 4:0.238

Test 5:0.237

Average: 0.232

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as limited to such specific claimed should not be unduly embodiments. Indeed, various modifications of the described modes for carrying out the invention which are obvious to those skilled in the art are intended to be within the scope of the following claims.

What is claimed is:

1. A multi-layer cooling material comprising:

an upper layer comprising at least one synthetic material, wherein said at least one synthetic material comprises a low molecular weight polyethylene;

an intermediate layer comprising polyester material;

a bottom layer comprising spandex and polyester, said amount of spandex in a range of between 1% and 10%; and a laminate having a thickness of between 0.01 and less than 0.1 mm and prevents particles greater than 1 micron from passing through the laminate;

wherein said multi-layer cooling material forms part of a bedding product.

2. The multi-layer cooling material according to claim 1, wherein said intermediate layer polyester material is a recycled polyester made from plastic bottles.

3. The multi-layer cooling material according to claim 1, wherein said at least one synthetic material comprises a polyester.

4. The multi-layer cooling material according to claim 1, wherein said upper layer, said intermediate layer, said bottom layer, or combinations thereof, include a cellulosic fiber of botanic origin.

5. The multi-layer cooling material according to claim 1, further including a phase change material (PCM).

6. The multi-layer cooling material according to claim 5, wherein said PCM material is microencapsulated.

7. The multi-layer cooling material according to claim 1, where said upper layer includes a graphene polyester.

8. The multi-layer cooling material according to claim 1, wherein said laminate is a thermoplastic polyurethane laminate.

9. The multi-layer cooling material according to claim 1, wherein said laminate has a thickness of 0.02 mm.

10. The multi-layer cooling material according to claim 1, wherein said bedding product is a bed sheet.

11. The multi-layer cooling material according to claim 1, wherein said bedding product is a mattress pad or protector.

12. The multi-layer cooling material according to claim 1, wherein said bedding product is a pillow.

13. The multi-layer cooling material according to claim 1, wherein the amount of said spandex is between 2% and 5%.

14. The multi-layer cooling material according to claim 13, wherein said laminate has a thickness of 0.02 mm.

15. The multi-layer cooling material according to claim 4, wherein said cellulosic fiber of botanic origin is lyocell fiber, modal fiber, or combinations thereof.

16. The multi-layer cooling material according to claim 4, wherein said cellulosic fiber of botanic origin is blended with other fibers.

* * * * *